United States Patent Office 2,959,589
Patented Nov. 8, 1960

2,959,589
HETEROCYCLIC MAGNESIUM CHLORIDE-CYCLIC ETHER GRIGNARD REAGENTS

Hugh E. Ramsden, Scotch Plains, N.J., assignor to Metal & Thermit Corporation, Woodbridge Township, Middlesex County, N.J., a corporation of New Jersey No Drawing. Filed Nov. 22, 1957, Ser. No. 698,074

16 Claims. (Cl. 260—251)

This application is a continuation-in-part of my copending application, Serial No. 549,545, filed November 28, 1955, which is in turn a continuation-in-part of my earlier applications, Serial Nos. 456,630 and 456,631, both filed September 16, 1954, now abandoned.

The present invention relates to new and useful products, heterocyclic magnesium chloride complexes, and to the method of preparing such products. These heterocyclic magnesium chloride complexes are of great value as synthetic intermediates and undergo most of the characteristic reactions of Grignard type reagents.

Heterocyclic chlorides of the type that exhibit aromatic or pseudo-aromatic characteristics are relatively inert to magnesium and hitherto it has not been possible to form heterocyclic magnesium chloride complexes by means of the usual Grignard reaction.

An object of the present invention is to obtain heterocyclic magnesium chloride complexes which may be prepared inexpensively from easily available heterocyclic chlorides of the type that exhibit aromatic or pseudo-aromatic characteristics.

It is also an object of the present invention to provide an inexpensive method for preparing heterocyclic magnesium chloride complexes from easily available heterocyclic chlorides of the type that exhibit aromatic or pseudo-aromatic characteristics.

Other and more detailed objects will be apparent from the following description and claims.

In accordance with the present invention it has been found that heterocyclic magnesium chloride complexes may be formed by reacting heterocyclic chlorides of the type that exhibit aromatic or pseudo-aromatic characteristics with magnesium in the presence of a ring compound Q, hereinafter defined. The method of preparation consists of using the compound Q as a reactant and preferably also as a solvent and a medium for the reaction in which the heterocyclic chloride prerequisite is reacted with magnesium with or without standard activation.

The compound "Q" as used in this description and the appended claims means a cyclic ether containing 5 or 6 members in the ring with at least one hydrogen atom attached to each carbon atom in the ring and having the formula:

wherein X is a methylene group or =NR" (R" being an alkyl group), R is an unsubstituted saturated divalent aliphatic hydrocarbon radical, R' is an ethylene radical, an ethylenically unsaturated divalent hydrocarbon radical or =CHR''' (R''' being hydrogen or an aliphatic radical), and O is oxygen. When X is =NR", the ring shall contain 6 members with X and O in a position 1:4 with respect to each other. Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. It is contemplated that compound Q may have substituted groups which are not reactive with organomagnesium chlorides, or with any of the other components and products of the reaction mixtures of the present process. This includes substituted and unsubstituted alkyl, aryl, alkoxy and aryloxy groups (all allowable substitutes being those unreactive to other components of the reaction mixture as specified hereinbefore). Where nitrogen replaces a carbon atom in the ring at X, the nitrogen atom must be substituted with a group, such as an alkyl group, which is unreactive to the reactants or reaction products. One of the inherent properties of compound Q is that the oxygen is available for electron donation, i.e., the free p-electrons present on the oxygen are available for coordination with the heterocyclic magnesium chloride. Any large blocking groups on the carbon atoms adjacent to the ring oxygen may impair the availability of these electrons and the reactivity of the compound Q for forming a complex and assisting in the reaction. In addition to the compounds listed hereinabove as being suitable for compound Q, other compounds satisfying the requirements for this complexing agent and solvent will be apparent to those skilled in the art from the teachings of the present invention, and are intended to be considered as equivalents. Since compound Q also apparently functions as a solvent, a compound Q which has a high melting point may still function in this invention, but if it is used as solvent, obviously the high melting point (e.g., above 90° C.) causes greater difficulty in carrying out the reaction.

The product of this invention may be described by the general formula: RMgCl·nQ where R represents a heterocyclic radical, Q has the significance ascribed to it above, and n is an indeterminate small number of at least 1.

As indicated hereinbefore, the heterocyclic chlorides of the present invention exhibit aromatic or pseudo-aromatic characteristics. To designate the type of heterocyclic chlorides contemplated, the term "aromatic heterocyclic chloride" is used in the appended claims. By this term is meant both mononucleate and polynucleate heterocyclic chlorides exhibiting aromatic characteristics wherein only one ring is a hetero ring and any other rings are aromatic carbocyclic rings, said hetero ring being selected from the class consisting of 5-membered rings having hetero atoms selected from the class consisting of oxygen, sulfur and tertiary nitrogen atoms and 6-membered rings wherein the hetero atoms are tertiary nitrogen atoms, said hetero atoms being bonded in the 5- and 6-membered rings only to carbon atoms. Among the aromatic heterocyclic chlorides within the scope of this definition and which may be used to form the heterocyclic magnesium chloride·nQ complexes of this invention are the following:

(1) Furan and polynucleate compounds having a furan ring such as—

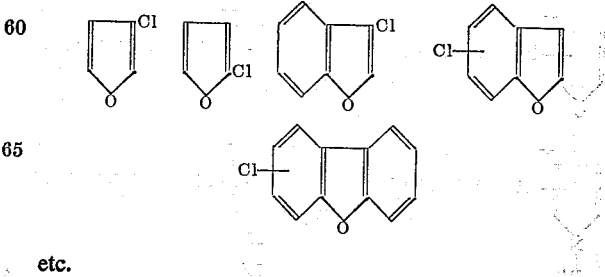

etc.

(2) Thiophene, benzothiophene, dibenzothiophene, and other thiophene type compounds such as—

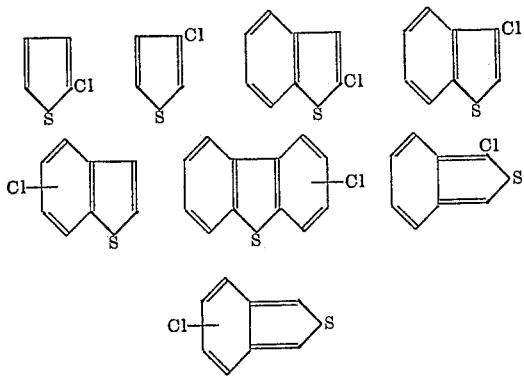

etc.

(3) Pyrrole, benzopyrrole, dibenzopyrrole, and other compounds containing the pyrrole ring structure such as—

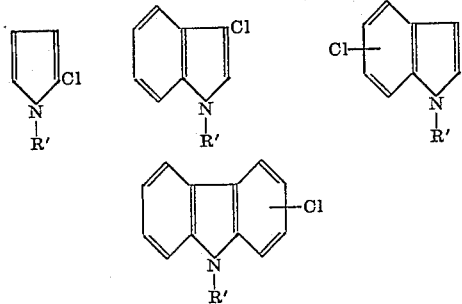

etc.

where R' represents any organic radical non-reactive to the heterocyclic magnesium chloride or the heterocyclic magnesium chloride·nQ complex.

(4) Compounds containing the pyridine ring structure such as—

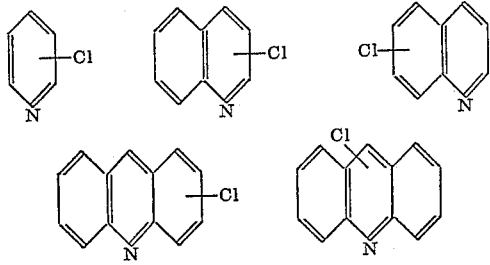

etc.

(5) Thiazole, oxazole and imidazole type compounds like—

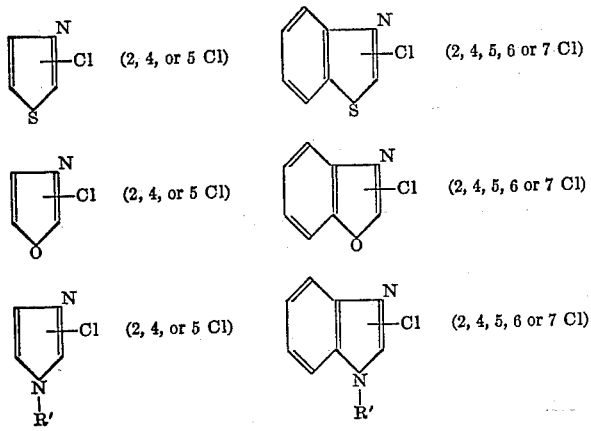

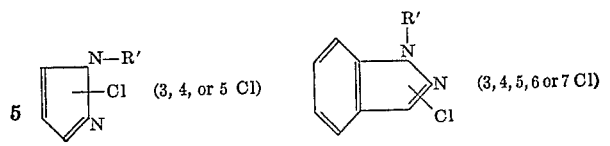

etc.

(6) Pyridazine, pyrazine, pyrimidine and triazine type compounds like—

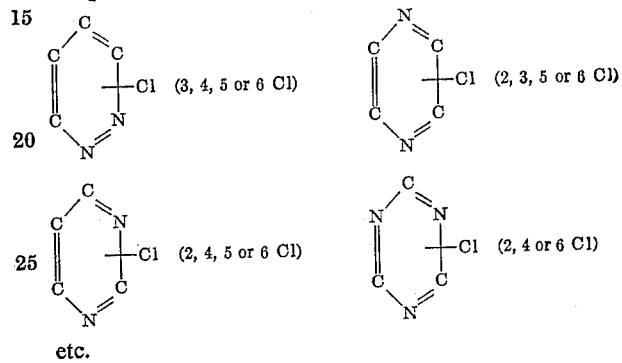

etc.

The heterocyclic chloride which forms a Grignard reagent with magnesium in the presence of the compound Q contains in its nuclear structure, in addition to carbon atoms, one or more elements from the class of oxygen, sulfur, and tertiary nitrogen which are bonded only to carbon atoms in the ring system.

The heterocyclic compounds may contain one ring or be polynucleate in structure, having up to 3 nuclei in the ring system. Any and all of the hydrogen atoms of the nucleus or nuclei may be replaced by chlorine, fluorine, monovalent radicals, and polyvalent radicals (usually divalent) arranged in such a manner as to form condensed rings. The organic substituents may be alkyl (substituted or unsubstituted) radicals, aryl (substituted or unsubstituted) radicals, alkoxy (substituted or unsubstituted) radicals, or aryloxy (substituted or unsubstituted) radicals, and where any two adjacent hydrocarbon groups may be linked or condensed to form a cyclic saturated or further condensed aromatic ring, or a combination of the two, with the limitation that the substituents may not themselves be functional groups reactive to heterocyclic magnesium chloride·nQ complex.

The length and size of the radicals that may replace the hydrogen of the heterocyclic nucleus or nuclei are not critical, since by definition, the groups are not reactive with the reactants or reaction products under process conditions. However, with presently available materials it is not contemplated that the hydrocarbon chains having more than 30 carbon atoms would be utilized as substituting groups.

A heterocyclic compound containing more than one active chlorine atom may react with magnesium in the presence of the compound Q to form polymagnesium chloride complexes in accordance with the following reaction:

(1) $RCl_a + bMg + nQ \rightarrow RCl_{a-b}(MgCl)_b \cdot nQ$
(2) $RCl_a + aMg + nQ \rightarrow R(MgCl)_a \cdot nQ$ where R represents a heterocyclic radical, $a$ is a whole number determined by the degree of chlorination of the aromatic or pseudo-aromatic carbons of the heterocyclic compound, $b$ is a whole number less than or equal to $a$, Q has the significance ascribed to it above and $n$ as a small number of at least one for each MgCl group.

In one method for the preparation of heterocyclic compounds of the present invention, heterocyclic chloride is dissolved in the compound Q and the mixture is added to magnesium. Another method of preparing the complex comprises dissolving a small amount of a heterocyclic chloride in compound Q, reacting this mixture with magnesium (initiating if necessary) and after the reaction commences, slowly adding the remainder of the heterocyclic chloride dissolved in compound Q. Excess amounts of compound Q (more than the theoretical 2 (or 1) moles required for complexing) are usually utilized in the process. This excess acts as a solvent. Another variation would consist in using an inert hydrocarbon as a diluent. However, for some reactants, initiation of the reaction is required and may be accomplished by any suitable means, such as the addition of a small amount of ethyl bromide and/or diethyl ether, an iodine crystal, etc. In many cases an exothermic reaction proceeds immediately. In some cases it is necessary to heat at reflux to obtain a reaction. The reaction mixture is preferably agitated during the course of the reaction and an inert atmosphere, e.g., nitrogen which is cheapest, is preferably maintained.

Using the compound Q as the reaction medium, the heterocyclic magnesium chloride complexes formed are believed to contain at least one molecule of Q for each molecule of heterocyclic magnesium chloride produced. Where the heterocyclic magnesium chloride is produced in a reaction medium containing more than equal molecular amounts of Q, the number of molecules in the complex may be in excess of one. The maximum number of molecules of Q which may be present in the complex is difficult to ascertain. When the maximum is exceeded, Q is present as a solvent for the complex. Where more than one molecule of Q is present in the complex, e.g., 3 molecules, it is possible to distill off the molecule in excess of one by adding a high-boiling, inert solvent, such as toluene, xylene, cumene or kerosene, and distilling. The last molecule of Q is bound to the complex quite tenaciously and is not removed readily. It is believed that the compound Q is complexed to the heterocyclic magnesium chloride in small whole numbers, i.e., 1, 2 or 3 molecules, and not in intermediate numbers. However, since the reaction product may exist in mixtures of complexes having different numbers of molecules of Q, it is possible that the average number of molecules of Q for each molecule of heterocyclic magnesium chloride may not be a whole number, i.e., 1.5. The precise manner in which the compound Q is complexed is not entirely known. It is presumably complexed as heterocyclic $MgCl \cdot Q$, but since Grignard reagents are also considered to exist according to the equilibrium:

$$RMgX \rightleftharpoons \tfrac{1}{2} R_2Mg + \tfrac{1}{2} MgX_2$$

it is conceivable that the complex of Q may exist as:

½ heterocyclic $Mg + \tfrac{1}{2} MgCl_2 \cdot Q$ rather than as heterocyclic $MgCl \cdot Q$. Consequently, when referring to the complex of the invention, it is intended to encompass whichever form may actually exist.

The following examples illustrate ways in which the principle of the invention can be employed, but they are not to be construed as limiting the invention.

*Example 1.—Preparation of thienyl magnesium chloride complex*

A reaction flask was charged with 24.3 grams (1 gram atom) of magnesium turnings, and purged with nitrogen. Ten (10) ml. of tetrahydrofuran was added, followed by an initiation mixture consisting of 2 ml. of ethyl bromide and one crystal of iodine. Reaction set in immediately. There was added slowly a mixture consisting of 118.5 grams (1 mole) of 2-chlorothiophene and 216.0 grams (3 moles) tetrahydrofuran, while stirring slowly. During this addition external heating was initiated and maintained until the temperature reached about 72° C. Thereafter, the reaction proceeded exothermically, the pot temperature reaching as high as 82° C. The addition of the remainder of the 2-chlorothiophene/tetrahydrofuran mixture was completed in about an hour. Heat was supplied for an additional half-hour after which all the magnesium had been consumed and the reaction was complete. After cooling to room temperature, the solution produced was diluted with sufficient tetrahydrofuran for thinning to permit easy titration, and the mixture titrated to determine the yield of thienyl magnesium chloride·tetrahydrofuran. The yield was 84.7%.

*Example 2.—Preparation of alpha-pyridyl magnesium chloride complex*

A reaction flask was charged with 21.5 grams (0.885 gram atom) of magnesium turnings and a small crystal of iodine, and purged with nitrogen. A mixture consisting of 100.0 grams (0.885 mole) of 2-chloropyridine dissolved in 216 grams (3 moles) of tetrahydrofuran was prepared. Ten (10) ml. of this mixture was added to the magnesium charge, and the reaction initiated with 2 ml. of ethyl bromide. Thereafter the remainder of the 2-chloropyridine/tetrahydrofuran mixture was added slowly with stirring but without external heating. The addition was completed after about an hour, during which period the mixture was refluxing at a pot temperature of about 65° C., the rate of refluxing being controlled by cooling in a water bath. The heater was then turned on to maintain refluxing for about three hours, and in this period 300 ml. additional tetrahydrofuran was added. After cooling to room temperature and dilution, the reaction mixture was titrated to determine yield of alpha-pyridyl magnesium chloride·tetrahydrofuran complex. This yield was found to be 55%.

*Example 3.—Preparation of 2-quinolyl magnesium chloride complex*

A reaction flask was charged with 14.8 grams (0.61 g. atom) of magnesium turnings and a small iodine crystal, and purged with nitrogen gas. A mixture consisting of 100 grams (0.61 mole) of 2-chloroquinoline dissolved in 131.8 grams (1.83 moles) of tetrahydrofuran was prepared. Ten (10) ml. of this mixture was added to the magnesium charge and the reaction initiated with 2 ml. of ethyl bromide. Thereafter, the remainder of 2-chloroquinoline/tetrahydrofuran mixture was added slowly with stirring. The reaction started immediately without the application of heat, the pot temperature reaching about 75° C., which is the refluxing temperature. The reaction mixture was refluxed for about one hour, after which 100 ml. tetrahydrofuran was added and the heater turned on for about 3 more hours. One hundred (100) ml. tetrahydrofuran was added for thinning purposes, the reaction mixture cooled to room temperature and titrated to determine the yield of 2-quinolyl magnesium chloride·tetrahydrofuran complex. This yield was found to be about 47.2%.

*Example 4.—Preparation of 6-quinolyl magnesium chloride complex*

A reaction flask was charged with 14.8 gms. (0.61 g. atom) of magnesium turnings and a small iodine crystal, and purged with nitrogen. A mixture consisting of 100 grams (0.61 mole) of 6-chloroquinoline dissolved in 144 grams (2 moles) of tetrahydrofuran was prepared and 10 ml. of this mixture was added to the charge in the flask plus 2 ml. of ethyl bromide, whereby the reaction was immediately initiated. The rest of the mixture of 6-chloroquinoline/tetrahydrofuran was then added slowly, while heating to reflux and while stirring. This addition was completed in about one hour. The reaction mixture was heated for an additional hour and 100 ml. tetrahydrofuran was added thereto. The reaction mixture was then heated for an additional three hours, after which time, 200 additional ml. tetrahydrofuran was added and the reaction mixture was cooled. The reaction mixture was thinned with tetrahydrofuran for easy handling. Titration indicated a yield of 61.6% 6-quinolyl magnesium chloride·tetrahydrofuran complex.

*Example 5.—Preparation of 8-quinolyl magnesium chloride complex*

A reaction flask was charged with 14.8 gms. (0.61 g. atom) of magnesium turnings and a small iodine crystal, and purged with nitrogen. A mixture consisting of 100 grams (0.61 mole) of 8-chloroquinoline dissolved in 144 grams (2 moles) of tetrahydrofuran was prepared and 10 ml. of this mixture was added to the charge in the flask plus 2 ml. of ethyl bromide whereby the reaction was instantly initiated. The rest of the 8-chloroquinoline/tetrahydrofuran mixture was then added slowly with agitation and the temperature rose to a reflux temperature of 75° C. This addition was completed in about one half hour. Thereafter, 100 ml. tetrahydrofuran was added and the heat was turned on for three additional hours. Another 100 ml. tetrahydrofuran was added and the reaction mixture heated for another three hours. Titration of the reaction mixture, cooled to room temperature and thinned with tetrahydrofuran, indicated a yield of 58.9% 8-quinolyl magnesium chloride·tetrahydrofuran complex.

*Example 6.—Preparation of 2-benzoxazolyl magnesium chloride complex*

A reaction flask was charged with 15.8 grams (0.65 g. atom) of magnesium turnings and a small iodine crystal, and purged with nitrogen. A mixture consisting of 100 grams (0.65 mole) of 2-chlorobenzoxazole dissolved in 144 grams (2 moles) of tetrahydrofuran was prepared and 10 ml. of this mixture was added to the charge in the flask in addition to 2 ml. of ethyl bromide. The rest of the 2-chlorobenzoxazole/tetrahydrofuran mixture was then added slowly while stirring. External heat was applied at the beginning but was turned off since reaction proceeded effectively exothermically, the mixture refluxing at 74° C. It required about one hour to add all of the 2-chlorobenzoxazole/tetrahydrofuran mixture. Thereafter, 100 ml. additional tetrahydrofuran was added, whereby the temperature dropped to 43° C. This reaction mixture by titration, after thinning with tetrahydrofuran, indicated a yield of about 74% 2-benzoxazolyl magnesium chloride·tetrahydrofuran complex.

*Example 7.—Preparation of 2-benzothiazolyl magnesium chloride complex*

A reaction flask was charged with 24.3 grams (1 g. atom) of magnesium turnings and a small iodine crystal, and purged with nitrogen. A mixture consisting of 169.5 grams (1 mole) of 2-chlorobenzothiazole dissolved in 216 grams (3 moles) of tetrahydrofuran was prepared, and 15 ml. of this mixture was added to the charge in the flask in addition to an initiator consisting of 2 ml. of ethyl bromide. The rest of the 2-chlorobenzothiazole/tetrahydrofuran mixture was then added slowly while stirring, this addition requiring about 2 hours. During this period the exothermic nature of the reaction eliminated the need for external heat, the pot temperature rising to about 74° C. After the addition of all the 2-chlorobenzothiazole/tetrahydrofuran mixture, 200 ml. tetrahydrofuran was added. The reaction mixture was then permitted to cool to room temperature and thinned with tetrahydrofuran for titration. The yield was 79% 2-benzothiazolyl magnesium chloride·tetrahydrofuran complex.

*Example 8.—Reaction of magnesium, 5-chloro-2-methyl-benzothiazole and tetrahydrofuran*

A reaction flask was charged with 13.25 grams (0.545 g. atom) of magnesium turnings and a small iodine crystal, and purged with nitrogen. A mixture consisting of 100 grams (0.545 mole) of 5-chloro-2-methylbenzothiazole dissolved in 108 grams (1.5 mole) of tetrahydrofuran was prepared, and 15 ml. of this mixture was added to the charge in the flask in addition to an initiator consisting of 2 ml. of ethyl bromide. The rest of the 5-chloro-2-methylbenzothiazole/tetrahydrofuran mixture was then added slowly while stirring. During this period external heat was applied, the pot temperature reaching 76.5° C. during this interval. The reaction mixture was then permitted to cool to room temperature, and was thinned with tetrahydrofuran for titration. The yield was 22% Grignard·tetrahydrofuran complex.

*Example 9.—Preparation of 6-chloro-2-methoxyacrid-9-yl magnesium chloride complex*

A reaction flask was charged with 8.75 grams (0.36 g. atom) of magnesium turnings and a small iodine crystal, and purged with nitrogen. A mixture consisting of 100 grams (0.36 mole) of 6,9-dichloro-2-methoxyacridine slurried in 216.0 grams (3 moles) of tetrahydrofuran was prepared, and 10 ml. of this mixture was added to the charge in the flask in addition to an initiator consisting of 2 ml. of ethyl bromide. The rest of the 6,9-dichloro-2-methoxyacridine/tetrahydrofuran mixture was then added slowly while stirring, this addition requiring about an hour and a half. During this period, external heat was applied, the pot temperature being maintained at about 70° C. After the addition of the 6,9-dichloro-2-methoxyacridine/tetrahydrofuran mixture, the application of external heat was continued for about one and a half hours. Titration of reaction mixture after dilution with tetrahydrofuran indicated a yield of about 68% 6-chloro-2-methoxyacrid-9-yl magnesium chloride·tetrahydrofuran complex.

*Example 10.—Reaction of magnesium, 4,6-dichloropyrimidine and tetrahydrofuran*

A reaction flask was charged with 4.03 grams (0.166 g. atom) of magnesium turnings and a small iodine crystal, and purged with nitrogen. A mixture consisting of 25 grams (0.166 mole) of 4,6-dichloropyrimidine dissolved in 36 grams (0.50 moles) tetrahydrofuran was prepared, and 5 ml. of this mixture was added to the charge in the flask in addition to an initiator consisting of 0.5 ml. of ethyl bromide. The rest of the 4,6-dichloropyrimidine/tetrahydrofuran mixture was then added slowly while stirring, with the application of external heat. The mixture was refluxed until reaction was completed. The reaction mixture was then diluted with tetrahydrofuran for titration. The yield was 24% of the magnesium chloride·tetrahydrofuran complex reagent, some of the magnesium remaining unused in the reaction mixture.

*Example 11.—Reaction of magnesium, 2-chlorofuran and tetrahydrofuran*

A reaction flask was charged with 12.2 grams (0.5 g. atom) of magnesium turnings and a small iodine crystal, and purged with nitrogen. Two ml. of ethyl bromide and 3 ml. of a mixture consisting of 51.3 grams (0.5 mole) 2-chlorofuran and 108 grams (1.5 mole) tetrahydrofuran were added to the charge in the flask. The rest of the mixture was added slowly with agitation and with the application of external heat. The mixture was refluxed, cooled and diluted with tetrahydrofuran. The yield of the magnesium chloride·tetrahydrofuran complex reagent was 10%, plus unreacted magnesium.

*Example 12.—Preparation of 2,5-di(magnesium chloride) thiophene complex*

A reaction flask was charged with 24.3 grams (1.0 g. atom) of magnesium turnings and a small iodine crystal, and purged with nitrogen. Two ml. of ethyl bromide and 3 ml. of a mixture consisting of 76.5 grams (0.5 mole) 2,5-dichlorothiophene, and 180.0 grams (2.5 moles) tetrahydrofuran were added to the charge in the flask. The rest of the mixture was added slowly with stirring. The temperature reached as high as 85° C.

The mixture was refluxed, and 72 grams (1 mole) of tetrahydrofuran was added to the mixture. The mixture was then cooled and diluted to 500 ml. with tetrahydrofuran and titrated. A yield of 76.3% 2,5-di(magnesium chloride) thiophene·tetrahydrofuran complex was found.

*Example 13.—Preparation of 2-chlorothiophene 5-magnesium chloride complex*

The some procedure was followed as in Example 12, using in this case 12.2 grams (0.5 mole) of magnesium, 76.5 grams (0.5 mole) of 2,5-dichlorothiophene and 108.0 grams (1.5 moles) of tetrahydrofuran, with an additional 1 mole of tetrahydrofuran for thinning. The temperature reached 120° C. in this reaction. After refluxing and cooling, titration under the same conditions as in Example 12 showed a yield of 88.2% of 2-chlorothiophene 5-magnesium chloride·tetrahydrofuran complex.

The following standard experimental procedure was used in the following examples. Where the experimental conditions deviated from the standard procedure, it is noted in the description of the experiment.

One g. atom (24.3 grams) of magnesium turnings were charged into a 1,000 ml. 3 neck flask which was then purged with nitrogen. In another flask, a mixture consisting of 1 mole of the heterocyclic chloride utilized was dissolved in 216.0 grams (3 moles) of tetrahydrofuran. Ten ml. of this mixture was then added to the charge in the 3 neck flask and the reaction was initiated by addition of 2 ml. of ethyl bromide and the addition of a small iodine crystal. After initiation of the reaction, the remainder of the heterocyclic chloride/tetrahydrofuran mix was slowly added to the 3 neck flask, with constant stirring. The formation of the heterocyclic magnesium chlorides is usually exothermic. When necessary, external heat was applied to the flask to keep the reaction going at reflux and/or to carry it to completion. At the completion of the reaction, the product was titrated in a standard Gilman test to determine the yield of aromatic magnesium chloride.

*Example 14.—Thienyl magnesium chloride*

One mole (118.5 grams) of 2-chlorothiophene was dissolved in the tetrahydrofuran. The reaction started at 45° C. and attained a maximum temperature of 71° C. The reaction was completed in 1 hour and 32 minutes. The yield of thienyl magnesium chloride·tetrahydrofuran complex was 84.7%.

*Example 15.—Dichlorotriazinyl magnesium chloride (cyanuric magnesium chloride)*

One-half mole (92.2 grams) of cyanuric chloride was dissolved in the tetrahydrofuran. One-half g. atom (12.2 grams) of magnesium turnings were used. The reaction was completed in 1 hour and 15 minutes. The yield of cyanuric magnesium chloride·tetrahydrofuran complex as determined by the amount of magnesium consumed was 71.3%.

*Example 16.—Grignard of 2-chlorofuran·tetrahydrofuran complex*

One-half mole (51.3 grams) of 2-chlorofuran was dissolved in 1.5 moles of tetrahydrofuran. One-half g. atom of magnesium was used. The reaction mixture refluxed at 71° C. The reaction was stopped in 14 hours.

*Example 17.—x,x',x" Trichloropyrimidyl magnesium chloride complex*

Thirty grams (0.138 mole) of 2,4,5,6-tetrachloropyrimidine were dissolved in 36 grams (0.5 mole) of tetrahydrofuran. Three and thirty-five hundredths (3.35) grams (0.138 g. atoms) of magnesium turnings and an iodine crystal were charged into the three neck flask. External heat was applied in the beginning of the reaction and withdrawn when it was noted that the reaction was exothermic. The reaction was completed in 1 hour. The yield of x,x',x" trichloropyrimidyl magnesium chloride·tetrahydrofuran complex was 37.8%.

*Example 18.—Grignard of 2,4,6-trichloropyrimidine·tetrahydrofuran complex*

Thirty grams of 2,4,6-trichloropyrimidine were dissolved in 36 grams of tetrahydrofuran. This mixture was slowly added to 4 grams of magnesium turnings, and the reaction initiated. The reaction mixture was held at reflux (about 70° C.) for 1 hour. A yield of 12.2% of the Grignard of 2,4,6-trichloropyrimidine complexed with tetrahydrofuran was obtained.

*Example 19.—3-octylpyridaz-5-ylmagnesium chloride complex*

One mole of 5-chloro-3-octylpyridazine in 3 moles of tetrahydropyran by the process of Example 10 yields 3-octylpyridaz-5-ylmagnesium chloride·tetrahydrofuran complex.

*Example 20.—5-hexylpyrazinyl-2-magnesium chloride complex*

One mole of 3-chloro-5-hexylpyrazine in 3 moles of 2-methyltetrahydrofuran by the process of Example 10 yields 5-hexylpyrazinyl-2-magnesium chloride·2-methyltetrahydrofuran complex.

*Example 21.—4 hexylthienyl-2-magnesium chloride complex*

In tetrahydrofurfuryl ethyl ether, 2 chloro-4 hexylthiophene yields, 4-hexylthienyl-2-magnesium chloride tetrahydrofurfuryl ethyl ether complex by the process of Example 1. The reaction temperature is kept to 65–70° C. during the reaction by cooling.

*Example 22.—4-octylthiophen-diyl-di(magnesium chloride) complex*

One mole of 2,5 dichloro-4 octylthiophene in 3 moles of 2-ethoxytetrahydropyran by the process of Example 12 yields 4-octylthiophen-diyl-di(magnesium chloride)·2 ethoxy-tetrahydropyran complex.

*Example 23.—3-pyridylmagnesium chloride complex*

Use of 3-chloropyridine in dihydropyran by the process of Example 1 yields 3-pyridylmagnesium chloride·dihydropyran complex.

*Example 24.—2,5-di(magnesium chloride) thiophene complex*

One half mole of 2,5-dichlorothiophene is dissolved in 1.5 moles (168.5 grams) of N-methylmorpholine. The solution is slowly added to one gram atom of magnesium turnings, the reaction initiated, brought to reflux, and held there, to yield 2,5-di(magnesium chloride) thiophene·N-methylmorpholine complex.

As those skilled in the art will appreciate, other complexing compounds Q may be employed in the foregoing examples as well as other heterocyclic chlorides.

The heterocyclic magnesium chloride complexes of this invention are useful as chemical intermediates in the preparation of organic compounds.

The heterocyclic magnesium chlorides are useful as ester interchange catalysts in preparing polyesters by condensing diesters of a dicarboxylic acid and polyhydroxy compounds. The polyesters so formed are used to spin valuable fibers. The present heterocyclic magnesium chlorides are also useful as Ziegler condensation catalysts, for the polymerization of ethylene to form polyethylenes. The latter, in film or sheet form, are widely used in the packaging industry.

As noted above the heterocyclic magnesium chloride complexes of this invention are very useful "tools" to the organic chemist in that they may be used to prepare many compounds, a good number of which are old and have been used for a time.

Various reactions wherein the present heterocyclic magnesium chloride complexes may be used are presented in the equations below:

RMgCl·nQ+R'CHO→RR'CHOH
RMgCl·nQ+R'R"CO→RR'R"COH
RMgCl·nQ+R'CO₂R"⟶RR'CO
　　　　　　　　　↓RMgCl·nQ
RMgCl·nQ+RR'CO→R₂RCOH
RMgCl·nQ+R'COX→RR'CO
RMgCl·nQ+R'CN→RR'CO
RMgCl·nQ+R"C(OR')₃→RR"C(OR')₂
RMgCl·nQ+HC(OR')₃→RC(OR')₂
RMgCl·nQ+R'R"C——CR'''R''''⟶
　　　　　　　　＼O／

RR'R"CCOHR'''R''''+R'R"COHCRR'''R''''
RMgCl·nQ+R'X→RR'
RMgCl·nQ+R'OSO₂R"→RR'
RMgCl·nQ+R'OSO₂OR'→RR'
RMgCl·nQ+XCH(R')OR"→RCH(R')OR"
RMgCl·nQ+R'CH(X)CH₂OR"→R'CH(R).CH₂OR"
RMgCl·nQ+R'R"XCCO₂R'''→RR'R"CCO₂R'''
RMgCl·nQ+S→RSH
RMgCl·nQ+Se→RSeH
RMgCl·nQ+Te→RTeH
RMgCl·nQ+O₂→ROH
RMgCl·nQ+SO₂→RSO₂H
RMgCl·nQ+SO₂Cl₂→RSO₂Cl
RMgCl·nQ+S₂Cl₂→RS₂R
RMgCl·nQ+MX_b→R_bM (b=valence of metal (M))
RMgCl·nQ+CO₂→RCO₂H
2 RMgCl·nQ+CO₂→R₂CO
RMgCl·nQ+CS₂→RCS₂H
RMgCl·nQ+XCO₂R'→RCO₂R'

In these equations R is a heterocyclic radical as defined above and R', R", R''' and R'''' are hydrocarbon groups, e.g., aliphatic, cycloaliphatic, aromatic or heterocyclic groups, X is fluorine, chlorine, bromine or iodine and M is a metal or metalloid from one of the following groups of the periodic table: Ib, IIb, III, IV, V, VI, VII and VIII, $n$ is a small number and at least one, and Q has the value ascribed to it above.

Of the many compounds having wide utility that may be made using the present Grignard reagents, may be mentioned nicotinic acid which is made from 3-pyridyl magnesium chloride·tetrahydrofuran complex of Example 23 by reaction with $CO_2$. This has wide use in the fortification of wheat flour and vitamin preparations to supply part of the B complex necessary in the diet, etc. 2-mercaptobenzothiazole may be prepared from the 2-benzothiazolyl magnesium chloride·tetrahydrofuran complex of Example 7 by the reaction with sulfur. The compound is a very valuable accelerator for the vulcanization of rubber.

The nicotinic acid made from the 3-pyridyl magnesium chloride·tetrahydrofuran complex as described above may further be reacted with lauryl amine to produce the substituted amide which has useful frothing properties and may be used as a detergent in shampoo compositions.

The thienyl magnesium chloride·tetrahydrofuran complex of Example 1 may be reacted with acyl chlorides to yield ketones of formula

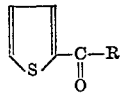

wherein R is an alkyl group having from 1 to 17 carbon atoms. These may be further reacted with alkyl or aryl amines to yield alkyl thienyl ketimines of formula

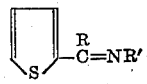

wherein R is an alkyl radical having from 1 to 17 carbon atoms and R' is an alkyl group having at least 5 carbon atoms or an aryl radical. This group of compounds is useful as an antioxidant for oils.

Mercaptothiazoles of general formula:

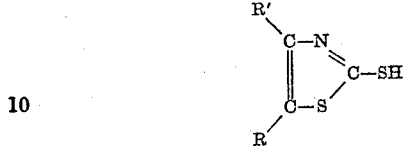

wherein R and R' are hydrogen or hydrocarbon groups, may be prepared from the corresponding magnesium chloride·tetrahydrofuran complex as described above by reaction with sulfur. This group of compounds is useful as metal de-activators in gasoline.

While the invention has been described with particular reference to specific embodiments, it is to be understood that it is not limited thereto but is to be construed broadly and restricted solely by the scope of the appended claims.

What is claimed is:

1. A process for producing a solution of a complex of an aromatic heterocyclic magnesium chloride and a cyclic ether which comprises reacting an aromatic heterocyclic chloride containing up to three rings and having a hetero ring selected from the class consisting of the furan, thiophene, tertiary-N-pyrrole, pyridine, thiazole, oxazole, tertiary-N-imidazole, pyridazine, pyrazine, pyrimidine and triazine rings, and at least an equimolecular amount of a cyclic ether, with magnesium, said cyclic ether having between 5 and 6 whole members, inclusive, in the ring with at least one hydrogen atom attached to each carbon atom in the ring, and having the formula:

wherein X is a member selected from the class consisting of methylene and the group =NR", wherein R" is an alkyl group, R is an unsubstituted alkylene radical, R' is a member selected from the class consisting of an ethylene radical, an ethylenically unsaturated divalent hydrocarbon radical and the group =CHR''', wherein R''' is a member selected from the class consisting of hydrogen, alkyl and alkoxy radicals, and O is oxygen; when X is the group =NR", the ring shall contain 6 members and X and O shall be in a position 1:4 with respect to each other.

2. A process according to claim 1 wherein the molecular amount of cyclic ether is in excess of a 1:1 ratio to the molecular amount of aromatic heterocyclic chloride.

3. A process according to claim 1 wherein the molecular amount of cyclic ether is in about 3:1 ratio to the molecular amount of aromatic heterocyclic chloride.

4. A process according to claim 1 wherein the cyclic ether is tetrahydrofuran.

5. A process according to claim 4 wherein the aromatic heterocyclic chloride is pyridyl chloride.

6. A process according to claim 4 wherein the aromatic heterocyclic chloride is thiophenyl chloride.

7. A process according to claim 4 wherein the aromatic heterocyclic chloride is furanyl chloride.

8. A process according to claim 4 wherein the aromatic heterocyclic chloride is quinolyl chloride.

9. A process according to claim 4 wherein the aromatic heterocyclic chloride is pyrimidyl chloride.

10. A solution of a complex of an aromatic heterocyclic chloride and at least an equimolecular amount of a cyclic ether; said aromatic heterocyclic chloride containing up to three rings and having a hetero ring selected from the class consisting of the furan, thiophene, tertiary-N-pyrrole, pyridine, thiazole, oxazole, tertiary-N-imidazole, pyridazine, pyrazine, pyrimidine and triazine rings; said cyclic ether having between 5 and 6 whole members, inclusive, in the ring with at least one hydrogen atom attached to each carbon atom in the ring, and having the formula:

wherein X is a member selected from the class consisting of methylene and the group =NR", wherein R" is an alkyl group, R is an unsubstituted alkylene radical, R' is a member selected from the class consisting of an ethylene radical, an ethylenically unsaturated divalent hydrocarbon radical and the group =CHR''', wherein R''' is a member selected from the class consisting of hydrogen, alkyl and alkoxy radicals, and O is oxygen; when X is the group =NR", the ring shall contain 6 members and X and O shall be in a position 1:4 with respect to each other; said complex being dissolved in said cyclic ether.

11. The composition of claim 10 in which the cyclic ether is tetrahydrofuran and the aromatic heterocyclic chloride is pyridyl chloride.

12. The composition of claim 10 in which the cyclic ether is tetrahydrofuran and the aromatic heterocyclic chloride is thiophenyl chloride.

13. The composition of claim 10 in which the cyclic ether is tetrahydrofuran and the aromatic heterocyclic chloride is furanyl chloride.

14. The composition of claim 10 in which the cyclic ether is tetrahydrofuran and the aromatic heterocyclic chloride is quinolyl chloride.

15. The composition of claim 10 in which the cyclic ether is tetrahydrofuran and the aromatic heterocyclic chloride is pyrimidyl chloride.

16. The composition of claim 10 in which the cyclic ether is tetrahydrofurfuryl ethyl ether and the aromatic heterocyclic chloride is pyridyl chloride.

References Cited in the file of this patent

UNITED STATES PATENTS 2,703,325    Speeter _____ Mar. 1, 1955

FOREIGN PATENTS 779,100    Great Britain _____ July 17, 1957

OTHER REFERENCES

Gilman et al.: Rec. Trav. Chim., vol. 46 (1927), pp. 463–464.

Wabaut et al.: Rec. Trav. Chim., vol. 74 (1955), pp. 1003–1005.

Normant: Compt. Rend., vol. 239 (1954), pp. 1510–12.

UNITED STATES PATENT OFFICE
CERTIFICATE OF CORRECTION

Patent No. 2,959,589                  November 8, 1960

Hugh E. Ramsden

It is hereby certified that error appears in the above numbered patent requiring correction and that the said Letters Patent should read as corrected below.

Column 12, lines 70 and 71, column 13, lines 22 and 25, and column 14, lines 2, 5, 8 and 11, before "chloride", each occurrence, insert -- magnesium --.

Signed and sealed this 6th day of April 1965.

(SEAL)
Attest:

ERNEST W. SWIDER
Attesting Officer

EDWARD J. BRENNER
Commissioner of Patents